United States Patent

[11] 3,575,648

| | | | | |
|---|---|---|---|---|
| [72] | Inventor | Lewis S. Ridding<br>Brinklow, Near Rugby, England | | |
| [21] | Appl. No. | 844,018 | | |
| [22] | Filed | July 23, 1969 | | |
| [45] | Patented | Apr. 20, 1971 | | |
| [73] | Assignee | Clark Equipment Company | | |
| [32] | Priority | July 26, 1968 | | |
| [33] | | Great Britain | | |
| [31] | | 35690/68 | | |

[54] ELECTRIC MOTOR CONTROL SYSTEM
12 Claims, 1 Drawing Fig.

[52] U.S. Cl. ................................................. 318/106,
318/59, 318/67
[51] Int. Cl. ..................................................... H02p 7/68
[50] Field of Search .......................................... 318/49, 59,
67, 80, 82, 83, 98, 106, 103, 109, 112

[56] References Cited
UNITED STATES PATENTS

| | | | |
|---|---|---|---|
| 3,168,688 | 2/1965 | Roggenkamp................ | 318/109 |
| 3,249,836 | 5/1966 | Stamm ......................... | 318/67 |

Primary Examiner—Oris L. Rader
Assistant Examiner—Thomas Langer
Attorneys—Kenneth C. Witt, John C. Wiessler, Robert H. Johnson and R. J. Falkowski ABSTRACT: A traction motor and a pump motor of an industrial lift truck are connected to be energized separately or simultaneously from a battery through a pulse modulation switching power unit. At full power requirements for one motor the pulse power switching unit is bypassed and that motor is connected directly to the battery. When both motors are operated simultaneously and at full power requirements, the pump motor operates at full power directly from the battery and the traction motor operates at a selected inching speed.

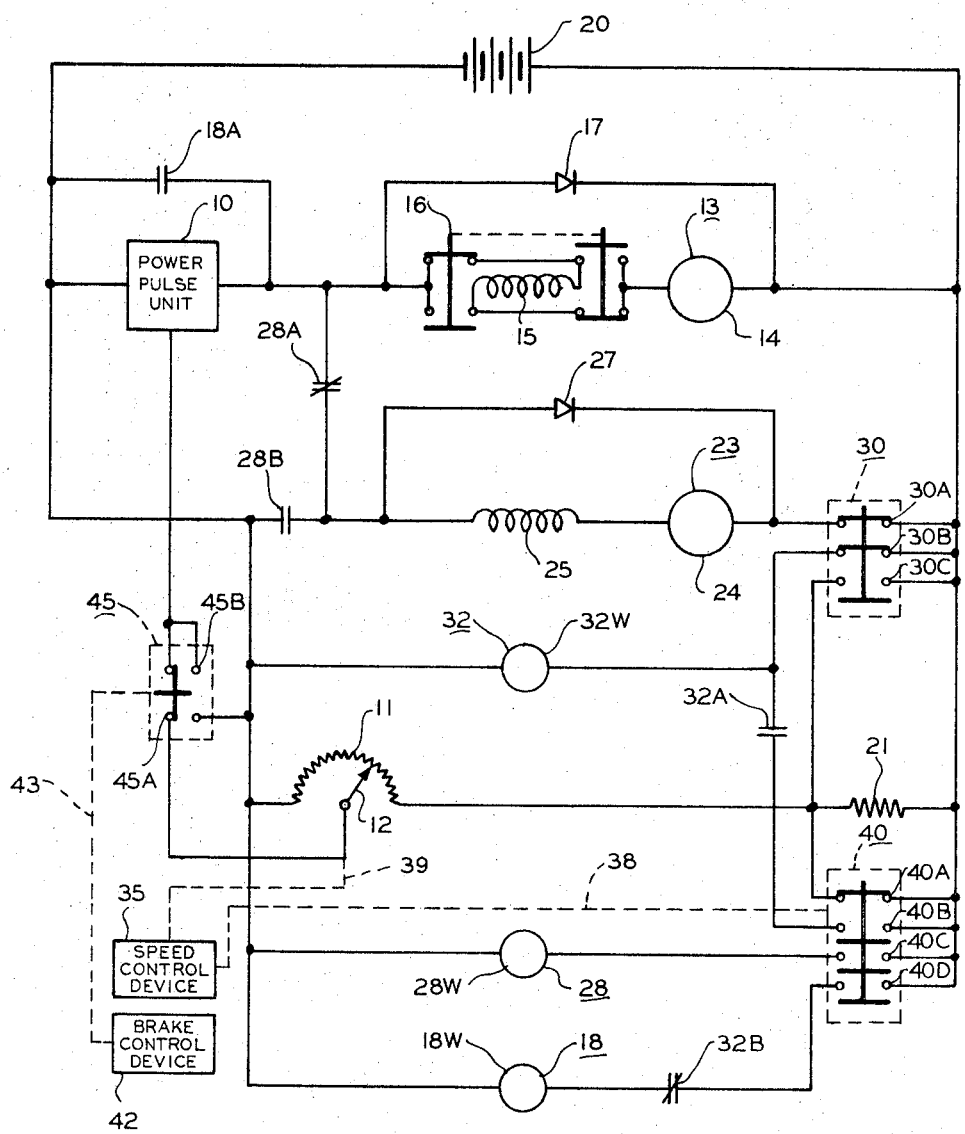

ELECTRIC MOTOR CONTROL SYSTEM

This invention relates to control systems for electric motors, particularly to pulse modulation control systems for multiple motor applications.

A common multiple motor application is in battery powered industrial trucks, such as fork lift trucks that have at least two electric motors operated from the battery supply carried by the truck. One motor is a traction motor that drives the wheels of the truck and the other is a hydraulic pump motor that provides hydraulic pressure for services such as lifting the forks and tilting the mast. Various types of controls for these motors have been developed. One such pulse modulation control has two separately controlled pulse or switching units, one for the traction motor and one for the pump motor. With two pulse switching units, each unit individually delivers power from the battery to the motor in a series of pulses that are varied to control the average power delivered to each motor in any manner known in the art.

With this invention a control system for two electric motors comprises an electrical power source, a means for producing a power pulse output at a selectable rate to control the average power delivered to the motor or motors, and a means for connecting the motors to be energized by the pulse output either separately or simultaneously. The power pulse output is shared between the motors or groups of motors and the motors share the output and increase in speed together as the average power delivered is increased. If desired, apportioning means may be provided for varying the share of the power output received by each motor or motor group. When maximum power operation is desired with one motor operating, the motor is connected directly across the power supply but with both motors operating, one of the motors is connected directly across the power supply and the other is operated at a reduced automatically controlled power level.

The objects and advantages of this invention will be apparent from the following detailed description.

The FIGURE is a schematic of a motor control system embodying this invention.

Referring to the FIGURE, a pulse modulation power switching means comprises a pulse modulation or power pulse unit 10, which may be of any desired type, that switches on and off at a selected rate to produce a pulse output at a controlled level for powering motors such as a traction motor 13 and a pump motor 23. Traction motor 13 is a series wound motor with an armature winding 14 and a field winding 15. A switch 16 connects motor 13 to a power supply, such as a battery 20, and is selectably operable to reverse the field of polarity for forward and reverse operation, A freewheeling diode 17 is connected across motor 13 and a free wheeling diode 27 is connected across motor 23.

Pump motor 23 is a series wound motor with an armature winding 24 and a field winding 25. Motor 23 is connected to battery 20 and pulse unit 10 through a normally closed contact 28A of a relay 28, which also comprises winding 28W and contact 28B and through a contact 30A of a manually operable pump motor control switch 30. Switch 30 is placed in the position shown in the FIGURE to energize the pump motor and also comprises a contact 30B that energizes a relay winding 32W of a relay 32, when switch 30 is in the position shown; and a contact 30C that shunts a resistance 21 when switch 30 is in its other position.

A means for controlling the power switching means comprises a speed control device 35, which would typically be a foot pedal with mechanical linkages, that has a variable resistance 11 with a tap 12 controllable in any known manner by control device 35 as illustrated by dotted line 39; and that comprises a switch 40 controlled in any known manner by control device 35 as illustrated by dotted line 38. Variable resistance 11 is connected to provide a selectable voltage level to pulse unit 10 to thereby control the pulse output in any known manner. Switch 40 contains four pairs of contacts; a normally closed contact 40A connected across fixed resistance 21, which is connected in series with resistance 11; a normally open contact 40B that provides an interlock control for relay 32, which comprises relay winding 32W, a normally open contact 32A, and a normally closed contact 32B; a normally open contact 40C which controls the energization of relay winding 28W; a normally open contact 40D which controls a relay winding 18W of a relay 18 that also comprises a bypass contact 18A connected across pulse unit 10.

A braking means for braking the vehicle comprises a brake control device 42, which would typically be a brake pedal that controls a switch 45, as illustrated by dotted line 43, that would typically be a switch operated by full depression of the brake pedal, that has a normally closed contact 45A and a normally open contact 45B.

In the operation of the circuit shown in an industrial fork left truck, to lift a load without moving the truck, switch 30 is moved to close contacts 30A and 30B and open contact 30C. The closing of contact 30A connects pump motor 23 to pulse unit 10 and battery 20 through normally closed contact 28A. The closing of contact 30B energizes relay winding 32W to close contact 32A, which operates with contact 40B to provide a locking or latching means for relay 32; and the opening of contact 32B prevents the energization of relay winding 18W regardless of the position of switch 40.

Movement of speed control device 35 operates to provide a positive voltage at a controlled level from arm 12 and variable resistance 11 to pulse unit 10 through switch 45. This enables control of the average power delivered to motor 23. Movement of speed control device 35 to a maximum output position operates switch 40 to change the position of switch 40 from the position shown in the FIGURE to close contacts 40B, 40C and 40D and open contact 40A. The closing of contact 40B latches relay 32 in an energized condition. The closing of contact 40C energizes relay winding 28W to close contact 28B and open contact 28A to thereby connect pump motor 23 directly across battery 20. The closing of contact 40D has no effect since contact 32B is open, but when contact 32B is closed, the closing of contact 40D energizes relay winding 18W to thereby close contact 18A. The opening of contact 40A removes a shunt from across resistance 21.

For traction only, without lift, switch 16 is operated to connect traction motor 13 to battery 20 through pulse unit 10 and select either forward or reverse travel. Movement of speed control device 35 controls the average power delivered to motor 13. Full movement of speed control device 35 to a maximum output position operates switch 40 to close contacts 40B, 40C and 40D and open contact 40A.

The closing of contact 40B has no effect because contact 32A is open. The closing of contact 40C energizes relay winding 28W to open contact 28A and close contact 28B but this has no effect because contact 30A is open. The closing of contact 40D, because contact 32B is closed, energizes relay winding 18W to close bypass contact 18A and thereby connect motor 13 directly across battery 20. The opening of contact 40A removes the shunt from across resistance 21 but has no effect because resistance 21 is shunted by closed contact 30C.

To lift a load and move the truck simultaneously, switch 30 is operated to close contact 30A and energize pump motor 23 and switch 16 is operated to energize traction motor 13 in the desired direction of motion. Motors 13 and 23 are shown connected in parallel, but the motors could be connected in series if desired. The operation of speed control device 35 decreases the effective value of resistance 11 at arm 12 and pulse unit 10 to thereby increase the average power delivered by pulse unit 10 and both motors accelerate. At the maximum position of speed control device 35, switch 40 is operated.

Upon the operation of switch 40, contacts 40B, 40C and 40D are closed and contact 40A is opened. Switch 30 is in the position shown in the FIGURE with contact 30A and contact 30B closed and contact 30C open. The closing of contact 40B latches in relay 32 through its closed contact 32A since relay winding 32W is energized through contact 30B. The closing of contact 40C energizes relay winding 28W to open contact 28A and close contact 28B to thereby connect pump motor 23 directly to battery 20. The closing of contact 40D, since relay winding 32W is energized and its contact 32B is open, has no effect and contact 18A remains open and motor 13 continues to be energized through pulse unit 10. The opening of contact 40A, since contact 30C is open, connects resistance 21 in series with variable resistance 11 to immediately lower the positive control potential delivered to pulse unit 10 from arm 12 to reduce the pulse rate and thereby reduce the power to a selected less than maximum level. This effectively limits the speed of movement of the truck to some preselected maximum speed, such as a selected inching speed, whenever pump motor 23 is operated simultaneously with traction motor 13 and speed control device 35 is moved to a position that closed switch 40.

Switch 45, which is controlled by brake control device 42, operates to reduce the input to pulse unit 10 from arm 12 of variable resistance 11 to zero when the brake is applied by opening contact 45A and connecting the pulse unit to the negative potential of the battery through contact 45B. The maximum lift with full pump motor can be obtained by operating speed control device 35 to operate switch 40 and by operating brake control lever 42 to turn off pulse unit 10 to stop the inching movement of the truck in a full power operation. The latching arrangement for relay 32 furnished by contact 32A and contact 40B prevents the application of full power to traction motor if switch 30 is operated to disconnect pump motor 23 during full power operation with both motors energized. The operation of switch 30 with the resultant opening of contact 30C does not deenergize relay 32 when in a full power condition because contact 40B is closed and keep relay winding 32W energized through its closed contact 32A. Without a latching or similar system, relay winding 32W would deenergize on the opening of contact 30C which would close contact 32B thereby energizing relay winding 18W to close bypass contact 18A. This would immediately apply full power to motor 13 by connecting motor 13 directly across battery 20.

It may also be desirable to prevent traction motor operation upon release of switch 40 which would change the power unit output from the inching speed level to near maximum output level. To do this a built-in time delay can be used to delay the shunting of resistance 21 for a predetermined time after switch 40 has been released from a maximum power operation of both motors simultaneously. This delay can commence from the time of the release of switch 40. Another arrangement could require the speed control device to be fully released and then again depressed before shunting resistance 21 so that the truck can again be accelerated.

While this specification contains a written description of the invention and the manner and process of making and using it and sets forth the best mode contemplated of carrying out my invention, there are many variations, combinations, alterations and modifications of the invention that can be made within the spirit of the invention and the scope of the appended claims.

I claim:

1. A control system for energizing two electric motors from an electrical power source comprising:
   a pulse modulation switching means for producing a power pulse output at a selected level;
   a means for energizing either one or both of the motors from the power output;
   means operable when only one motor is energized and maximum power operation is selected for connecting the energized motor directly to the power source;
   means operable automatically when both motors are energized and maximum power operation is selected for connecting one motor directly to the power source and the other motor to receive the pulse output; and
   means operable automatically when both motors are energized and maximum power operation is selected for controlling the switching means to produce a selected limited power level output.

2. A control system according to claim 1 wherein said one motor is a pump motor and the other motor is a traction motor in an industrial truck and said limited power level output is selected to produce an inching speed for the traction motor.

3. A control system according to claim 2 wherein said switching means is controlled by a movable speed control device having a maximum power operation position that effects connection of the operating motor directly to the power source.

4. A control system according to claim 2 also comprising means for braking the industrial truck and means responsive to the means for braking for controlling the switching means to reduce the power output level to zero.

5. A control system according to claim 2 wherein said speed control device is a potentiometer having a tap connected as an input to the switching means and said maximum power operation position activates a switch that effects connection of the operating motor directly to the power source.

6. A control system according to claim 5 wherein a resistance is connected in series with the potentiometer to decrease the output level at the tap to produce the inching speed for the traction motor.

7. A control system according to claim 6 wherein said power source is a battery.

8. An industrial truck power control system comprising:
   a battery;
   a traction motor adapted to drive the truck;
   a pump motor adapted to provide hydraulic pressure for operation of the hydraulic system of the truck;
   a pulse modulation power switching unit connectable to the battery and adapted to produce a power pulse output variable from a zero level to a maximum level;
   a speed control device adapted to control the power switching unit output level in response to selective positioning of said control device;
   first means for connecting the traction motor to receive the power output;
   second means for connecting the pump motor to receive the power output;
   third means for connecting the traction motor directly to the battery to thereby bypass the power switching unit;
   fourth means for connecting the pump motor directly to the battery to thereby bypass the power switching unit;
   fifth means responsive to a selected position of the speed control device for limiting the power switching means to produce a power output level selected to move the industrial truck at inching speed;
   sixth means for automatically actuating one or both of the first means and the second means;
   seventh means for automatically actuating the third means in response both to actuation of the first means only by the sixth means and to the selected position of the speed control device;
   eighth means for automatically actuating the fourth means in response both to actuation of the second means only by the sixth means and to the selected position of the speed control device; and
   ninth means for simultaneously actuating the fourth means and the fifth means in response both to actuation of both the first means and the second means by the sixth means and to the selected position of the speed control device.

9. A power control system according to claim 8 also comprising means for making the third means inoperative upon deenergization of the pump motor following actuation of the ninth means.

10. A power control system according to claim 8 also comprising means for braking the vehicle, and means for controlling the power switching means to reduce the pulse output to the zero level in response to actuation of the means for braking.

11. A control system for energizing two electric motors from a common DC power source comprising:
   a pulse modulation power switching means capable of producing a power pulse output at selected levels;
   a movable controller;

means on initial moving of said controller to increase the selected level of the power pulse output to energize both of said motors in parallel;

means on further movement of said controller to energize one of said motors directly from said power source and the other of said motors from said pulse modulation switching means.

12. A control system for electric motors as claimed in claim 11 also comprising:

means for braking the vehicle, and means for controlling the power switching means to reduce the pulse output to the zero level in response to actuation of said means for braking.